March 19, 1929.  T. E. EIDEL, JR  1,705,811
QUICK ACTION LOCK NUT
Filed Oct. 31, 1927
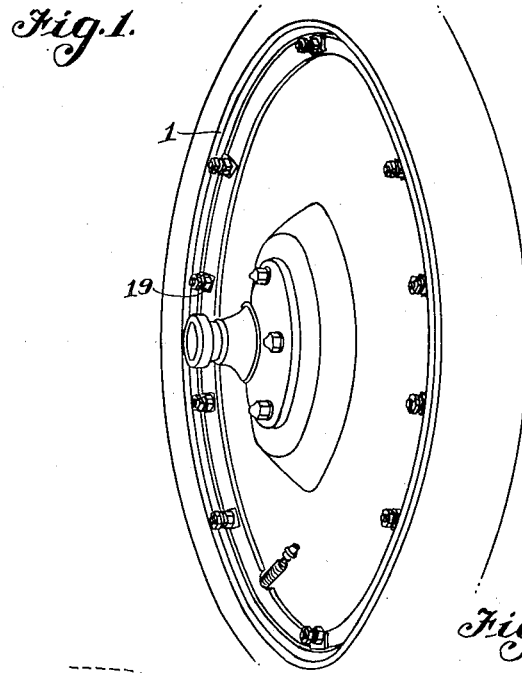
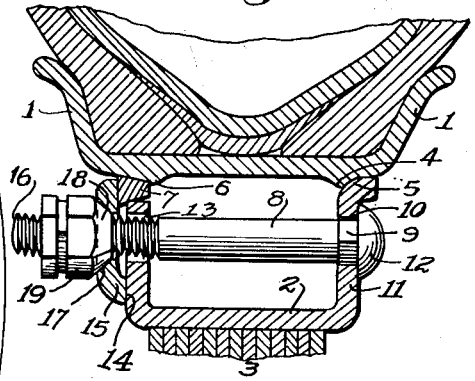
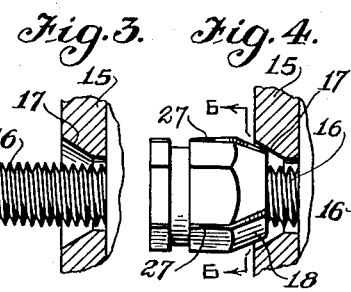
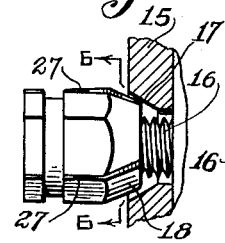
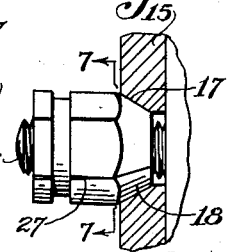
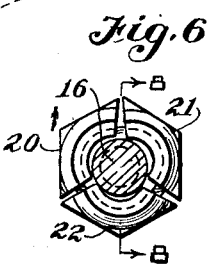
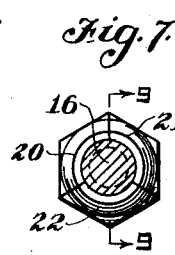
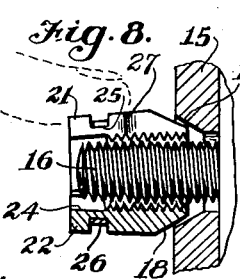
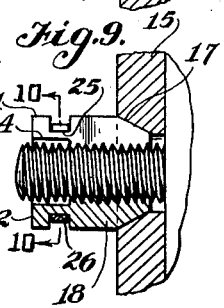
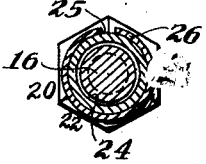
Inventor
Thomas E. Eidel
By Mason Fenwick & Lawrence
Attorney Patented Mar. 19, 1929.

1,705,811

UNITED STATES PATENT OFFICE.

THOMAS EDWARD EIDEL, JR., OF HORNELL, NEW YORK.

QUICK-ACTION LOCK NUT.

Application filed October 31, 1927. Serial No. 230,005.

This invention relates to a quick-action combined bolt and nut assembly designed to secure two detachably connected members to each other.

While the invention was primarily designed to secure and lock the rim of an automobile tire to the body of the wheel, it is also adapted and intended to be used wherever two members are adapted to be detachably secured to each other.

The main object of the invention is therefore to provide a quick acting nut and cooperating washer or plate which can be applied to any two members to lock them together speedily and securely.

Other objects of the invention will appear as the detailed description proceeds.

In the drawings;

Figure 1 is a perspective view of an automobile tire and wheel utilizing the present invention to secure the tire rim to the body of the wheel;

Figure 2 is a fragmentary central vertical section through part of the tire, rim, and the bolt assembly for connecting the wheel rim to the tire rim;

Figure 3 is a fragmentary view showing in perspective, the nut element of this invention separated from its bolt, and showing the bolt and cooperating washer or plate on vertical section;

Figure 4 illustrates, in part section and part elevation, the nut as partly positioned on its bolt and just beginning to contact with its cooperating washer;

Figure 5 is a fragmentary detail showing the nut in locking position on its cooperating bolt and washer or plate;

Figure 6 is a vertical section on the line 6—6 of Figure 4;

Figure 7 is a vertical section on the line 7—7 of Figure 5;

Figure 8 is a vertical section on the line 8—8 of Figure 6;

Figure 9 is a section on the line 9—9 of Figure 7; and

Figure 10 is a section on line 10—10 of Figure 9.

In Figures 1 and 2, the invention is illustrated as applied to lock a tire rim 1 detachably to the rim 2 of a wheel 3. As shown in Figure 2, the tire rim 1 is provided at one side with an annular projection 4, adapted to provide a seat for the curved edge 5 of rim 2, and has its side provided with an annular beveled projection 6 adapted to form a seat for a correspondingly beveled wedge ring 7.

A bolt 8 having a polygonal end 9, seated in a correspondingly shaped aperture 10 in the side 11 of rim 2, and has a head 12 adapted to seat against the side 11 to prevent the bolt being turned in the rim or pulled therethrough. The bolt 8 is cylindrical where it extends from end 9 and is screw-threaded at its other end which passes freely through an aperture 13 formed on the side 14 of rim 2. The side 14 is made shorter than side 11 in order to provide an annular space between the edge of side 14 and beveled projections 6 to receive the wedge ring 7.

A cupped washer plate 15 is slid over the screw-threaded end 16 of bolt 8 and has its opposite ends in contact with the side 14 and ring 7. The aperture of the washer plate 15 is sharply beveled as at 17 to provide a seat for the correspondingly beveled end 18 of the nut 19, the structural details of which are clearly shown in the remaining figures of the drawing.

The nut 19 is made in three separate rods 20, 21 and 22. These rods are identical in cross section and when placed together form a compound rod of hexagon cross section. The rods are cut into nut lengths and three of these nut length sections are placed together in a chuck to be bored and screw-threaded. The bore is drilled in two parts, one part 23 being screw-threaded and fitting exactly on the screw-threaded end 16 of the bolt, the other part 24 being bored smooth and larger in diameter than the screw-threaded part. The end 18 of the assembled nut 19 is then beveled to fit seat 17 of washer plate 15, and the other end of the assembled nut is provided with an annular groove 25 designed to receive a split spring band 26 to hold the several parts of the nuts assembled.

Before the band 26 is applied, the upper adjacent contact faces of the sections are slightly beveled so that each section rocks on the two adjacent sections and the band 26, when positioned in its groove 25, holds the screw-threaded ends of the nut sections normally separated as shown in Figures 3 and 8.

The bore 24 is made of such diameter, and the fulcrum points 27 formed by beveling the opposed upper faces of the nut sections are so located that the nut 19 is normally held expanded by band 26, as shown in Figure 3, and may be slid freely over the screw-threaded part of the bolt 16 until the beveled faces 18 contact with the beveled face 17 of the washer or plate 15 as shown in Figure 4. Further sliding movement of nut 19 against the beveled face 17 forces the screw-threads of the nut section against the threads 16 of bolt 8; and, then, the nut must be turned on said threads to lock the washer or plate to the bolt 8.

It will readily apparent from the drawing that the nut described herein is a self-locking nut, since the spring band 26 exerts tension on the beveled ends of the sections 20, 21 and 22, and the cooperating beveled faces of the nut and washer plate serve to jam the threads of the nut tightly against those of the bolt.

While the aperture of the washer plate is shown as conically countersunk, it must be understood that the invention is not limited to this construction, as the washer aperture may be made cylindrical or even square; all that is essential is that the aperture be made slightly smaller in diameter than the widest diameter of the beveled parts 18. Obviously, contact of the cylindrical edge of the washer aperture with the beveled part 18 will force the screw-threads of the nut into engagement with those of the bolt when the nut is turned on.

Broadly the invention is designed to lock any two bodies together very quickly and without the use of lock nuts. It is particularly adapted to secure cylinder heads, crank cases and similar parts of their engine blocks. Wherever the invention may be employed, it is obvious that the holes around the screwthreaded shank of the bolt must either be countersunk to fit the beveled ends of the nuts, or must be small enough in diameter to pinch the threaded parts of the nuts tightly onto the screwthreads of the bolts.

Having thus described my invention what I claim is:—

1. The combination with a body having a screw-threaded bolt extending therefrom, a member having an aperture slightly larger than and surrounding said bolt, a nut split axially and assembled in sections around said bolt and having one end of each section bevelled to contact with the edge of said aperture and seat therein, said nut having a portion of its bore screwthreaded to mesh with the threads of said bolt and having the remainder of its bore larger in diameter than the screwthreaded portion thereof, each section having each of its edges which contacts with the edge of the adjacent section formed to provide a fulcrum on which the adjacent section is adapted to rock when the nut is assembled, and yielding means for holding said sections assembled with the screwthreaded portions thereof normally separated from each other and from the screwthreads of said bolt but adapted to have said portions rocked into substantial contact with each other and into mesh with the threads on said bolt by rotary contact of said bevelled ends with the edge of said aperture.

2. A nut split axially and assembled in sections each having each of its edges which contacts with the edge of the adjacent section formed to provide a fulcrum on which the adjacent section is adapted to rock when the nut is assembled, the bore of said nut on one side of said fulcrum being screwthreaded while the bore on the other side thereof is of larger diameter than that of the screwthreaded side, and yielding means for holding said sections assembled with the screwthreaded parts thereof normally separated from each other but adapted to rock into substantial contact with each other and into mesh with the threads of a bolt or similar device.

3. A nut split axially and assembled in sections each having each of its edges which contacts with the edge of the adjacent section formed to provide a fulcrum on which the adjacent section is adapted to rock when the nut is assembled, the bore of said nut on one side of said fulcrum being screwthreaded while the bore on the other side thereof is of larger diameter than that of the screwthreaded side, and a split ring extending around the parts of said sections remote from the screwthreaded parts to hold the sections assembled with the screwthreaded parts thereof normally separated from each other but adapted to rock into substantial contact with each other and into mesh with the threads of a bolt or similar device.

In testimony whereof I affix my signature.

THOMAS EDWARD EIDEL, Jr.